US006313877B1

(12) United States Patent
Anderson

(10) Patent No.: US 6,313,877 B1
(45) Date of Patent: Nov. 6, 2001

(54) METHOD AND SYSTEM FOR AUTOMATICALLY MANAGING DISPLAY FORMATS FOR A PERIPHERAL DISPLAY COUPLED TO A DIGITAL IMAGING DEVICE

(75) Inventor: Eric C. Anderson, San Jose, CA (US)

(73) Assignee: FlashPoint Technology, Inc., San Jose, CA (US)

( * ) Notice: Subject to any disclaimer, the term of this patent is extended or adjusted under 35 U.S.C. 154(b) by 0 days.

(21) Appl. No.: 08/920,563

(22) Filed: Aug. 29, 1997

(51) Int. Cl.[7] .................................................. H04N 5/222
(52) U.S. Cl. ...................... 348/333.05; 358/906; 345/348
(58) Field of Search ..................................... 348/207, 239, 348/333.11, 333.12, 222, 232, 233, 552, 333.13, 333.05, 333.07; 358/906, 909.1; 345/348, 349

(56) References Cited

U.S. PATENT DOCUMENTS

| 5,729,289 | * | 3/1998 | Etoh ................................ 348/333.07 |
| 5,974,386 | * | 10/1999 | Ejima et al. ........................... 704/276 |
| 5,978,020 | * | 11/1999 | Watanabe et al. .................... 348/207 |
| 6,111,604 | * | 8/2000 | Hashimoto et al. .................. 348/207 |

* cited by examiner

Primary Examiner—Wendy R. Garber
Assistant Examiner—Alicia M Harrington
(74) Attorney, Agent, or Firm—Sawyer Law Group LLP

(57) ABSTRACT

The present invention provides a system and method for managing display formats for a peripheral display coupled to an digital imaging device. The system and method comprising the steps of detecting the coupling between the digital imaging device and the peripheral display; and automatically switching a first display format of the digital imaging device to a second display format for the peripheral display.

16 Claims, 9 Drawing Sheets

METHOD AND SYSTEM FOR AUTOMATICALLY MANAGING DISPLAY FORMATS FOR A PERIPHERAL DISPLAY COUPLED TO A DIGITAL IMAGING DEVICE

FIELD OF THE INVENTION

The present invention relates generally to digital cameras, and more particularly to a method and system for automatically managing display formats for a peripheral display coupled to a digital imaging device.

BACKGROUND OF THE INVENTION

Most digital cameras today are similar in size to and behave like conventional point-and-shoot cameras. Unlike conventional cameras, however, most digital cameras store digital images in an internal flash memory or on external memory cards, and some are equipped with a liquid-crystal display (LCD) screen on the back of the camera. Through the use of the LCD, most digital cameras operate in two modes, record and play, although some only have a record mode. In record mode, the LCD is used as a viewfinder in which the user may view an object or scene before taking a picture. In play mode, the LCD is used as a playback screen for allowing the user to review previously captured images either individually or in arrays of four, nine, or sixteen images.

Digital cameras can typically be coupled with a peripheral display, such as a television set or a computer display. In this manner, the user may view the various images stored within the digital camera on a larger display. However, even when the peripheral display is connected to the digital camera, the same low resolution and same format of the digital camera is shown on the peripheral display. Thus, despite the larger size of the peripheral display, the quality of the images are not improved by viewing the peripheral display and the user may still need to scroll through a large number of images before finding the desired image.

What is needed is a system and method for automatically taking advantage of the larger size and higher resolution of peripheral display devices. The present invention addresses such a need.

SUMMARY OF THE INVENTION

The present invention provides a system and method for managing display formats for a peripheral display coupled to an digital imaging device. The system and method includes the steps of detecting the coupling between the digital imaging device and the peripheral display; and automatically switching a first display format of the digital imaging device to a second display format for the peripheral display.

DETAILED DESCRIPTION OF THE INVENTION

The present invention relates to a system and method for automatically managing display formats for a peripheral display coupled to a digital camera. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any digital imaging device which displays images, icons, and flash or other items, could incorporate the features described herein below and that device would be within the spirit and scope of the present invention. Thus, the present invention is not intended to be limited to the embodiment shown but is to be accorded the widest scope consistent with the principles and features described herein.

The present invention relates to a system and method for automatically managing display formats for a peripheral display coupled to a digital camera. According to the present invention, a system and method are provided which provide a digital camera with the ability to automatically switch image array size when the digital camera is coupled with a peripheral display. In operation, when a digital camera is coupled with a peripheral display, the graphical format utilized in the LCD of the digital camera is automatically switched to a second graphical format for the peripheral display. The second graphical format takes advantage of the larger display size of the peripheral display and displays a larger number of images at a given time. For example, eight small images can be shown across the peripheral display, in addition to a larger selected image as well as text and icons, rather than the limited number of images that can be shown in the small camera LCD. Alternatively, the entire peripheral display can be filled with many various images to avoid the user having to continually search through various different sets of images displayed on the peripheral display.

Figure 1:
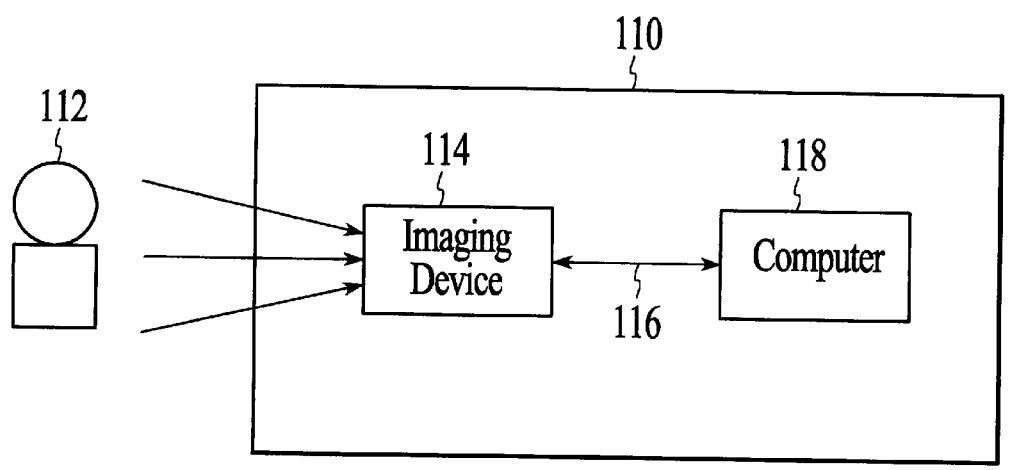
FIG. 1 is a block diagram of a digital camera in which the present invention can reside.

Referring now to FIG. 1, a block diagram of an example of a digital camera 110 which can be used in accordance with the present invention is shown. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
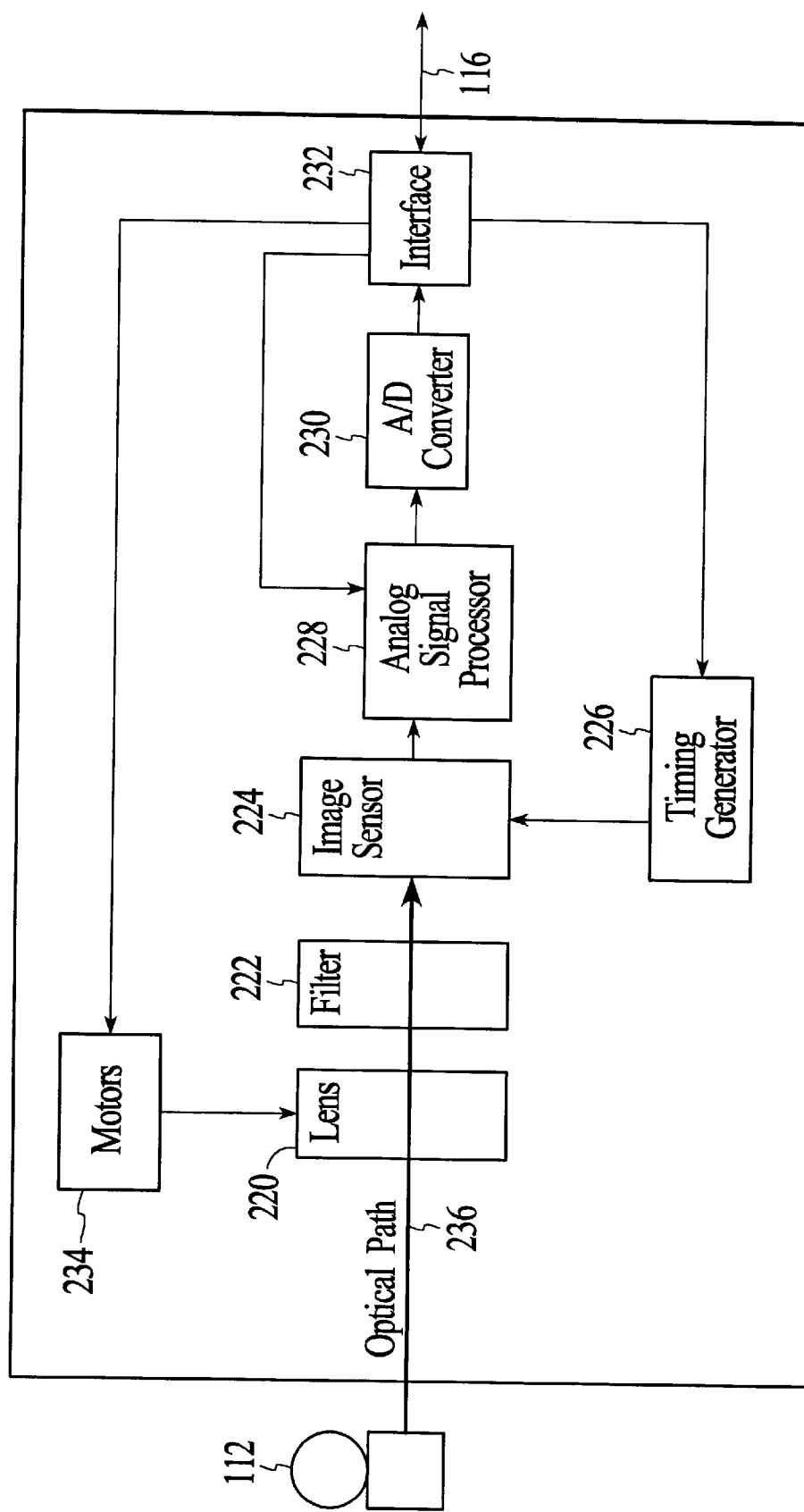
FIG. 2 is a block diagram of an example of an imaging device of FIG. 1.

Referring now to FIG. 2, a block diagram of an example of an imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

Imaging device 114 captures an image of object 112 via reflected light impacting image sensor 224 along optical path 236. Image sensor 224, which is preferably a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
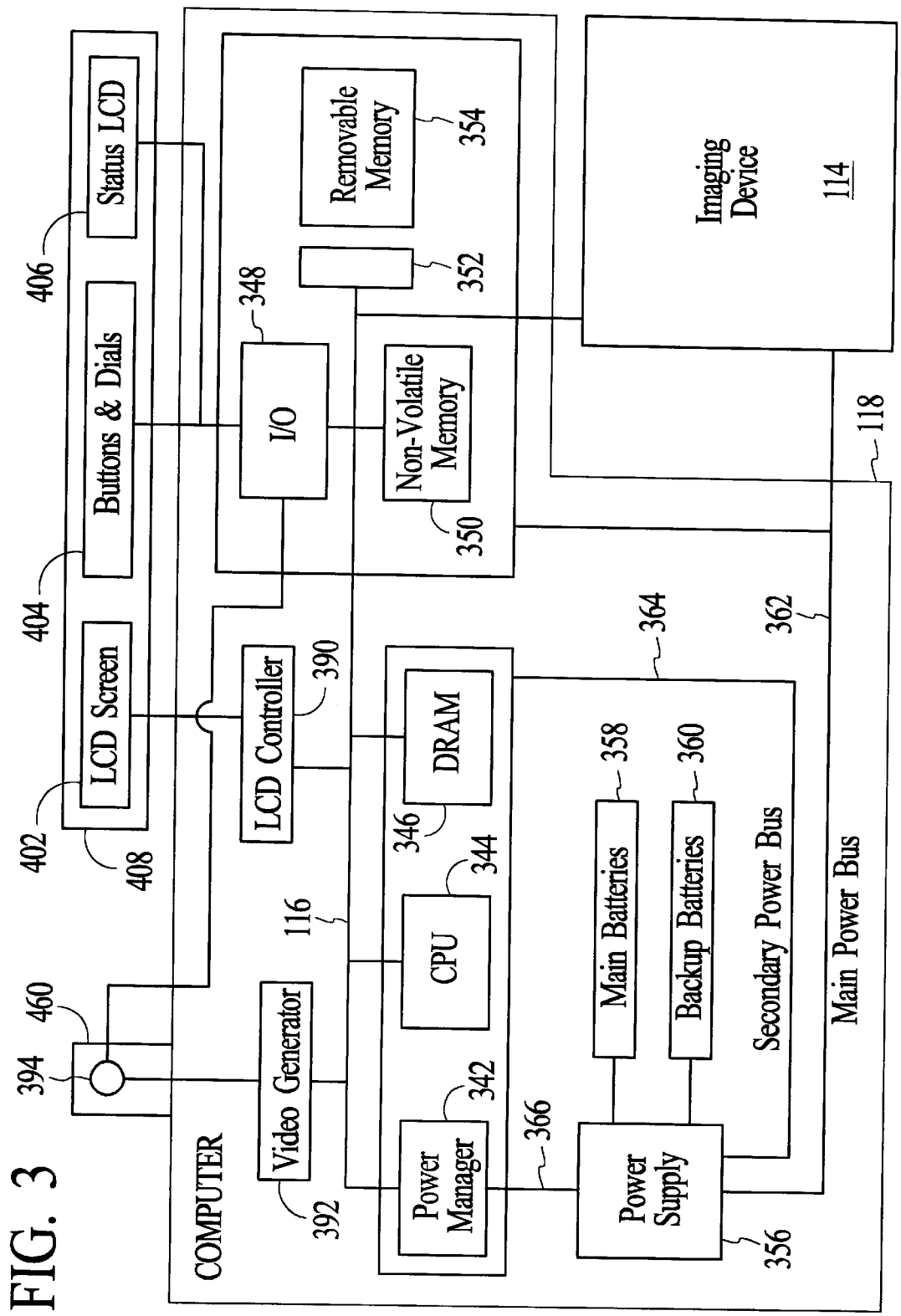
FIG. 3 is a block diagram of an example of the computer of FIG. 1.

Referring now to FIG. 3, a block diagram of an example of computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352. Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions. LCD controller 390 accesses DRAM 346 and transfers processed image data to LCD screen 402 for display. Additionally, a video generator 392 is also coupled to the CPU 344 and DRAM 346. The video generator is also coupled with a peripheral display port 460, which is shown to include a sense switch 394.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. Removable memory 354 can be implemented by using a flash disk.

Power supply 356 supplies operating power to the various components of camera 110. The power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4:
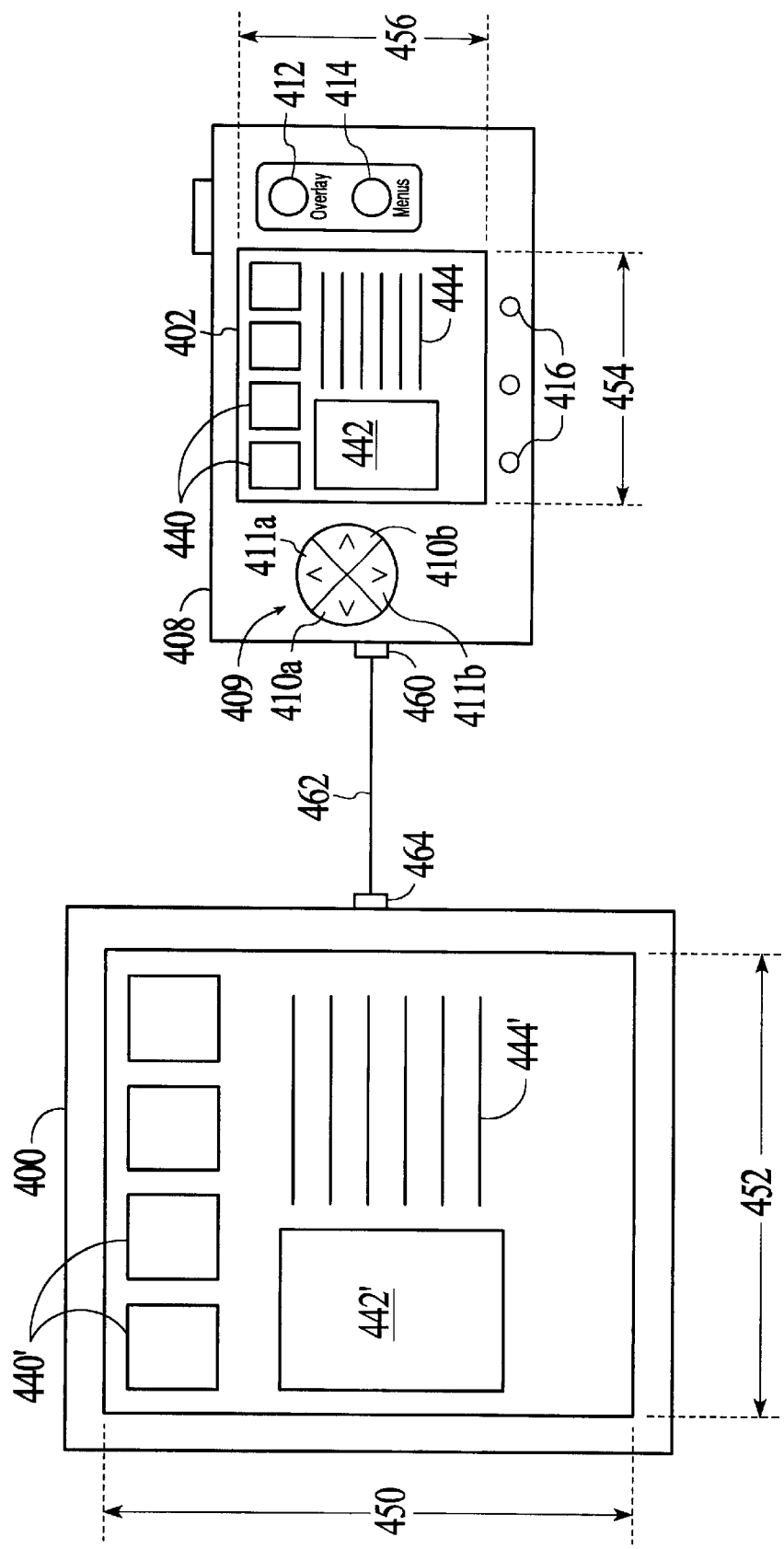
FIG. 4 is a diagram showing a digital camera coupled to a peripheral display.

FIG. 4 shows a diagram of a digital camera coupled with a peripheral display. FIG. 4 includes a digital camera 408 with a four-way navigation control button 409, and an LCD 402 which is shown displaying small, low-resolution images called thumbnails 440, resized thumbnail 442, and text 444. The digital camera 408 is shown coupled to the peripheral display 400 through the camera's peripheral display port 460, which is preferably connected to a port 464 on the peripheral display port 460 through a connection 462.

Figure 5:
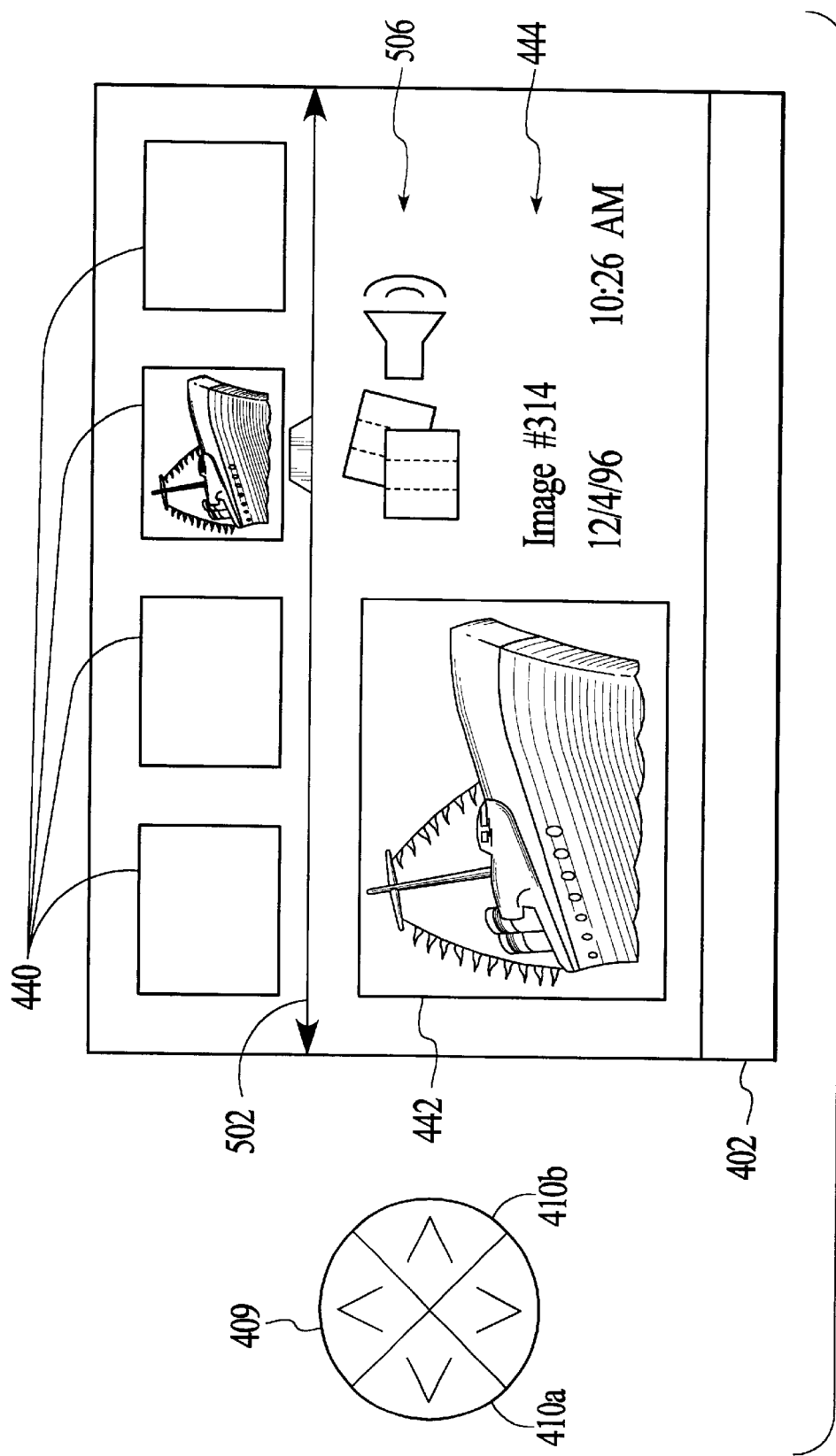
FIG. 5 is an example of a display format used on an LCD of a digital camera.

FIG. 5 is a diagram illustrating the display format on the LCD 402 and the peripheral display 400 shown in FIG. 4. In a preferred embodiment the display format can display four small thumbnails 440 (50×50 pixels) at a time and can be based on a filmstrip metaphor which allows users to quickly move forward and backward among pictures chronologically according to date and time. The user may navigate through the series of small thumbnails 440 in the LCD screen 402 using the four-way navigation control button 409. When the user depresses or holds down the left/right buttons 410, the small thumbnails 440 are scrolled-off the LCD screen 402 and replaced by new small thumbnails 440 representing other captured images to provide for fast browsing of the camera contents. A stationary selection arrow line 502 can be used as both a navigational aid and to indicate which small thumbnail 440 is the currently selected image. As the user presses the navigation buttons 410 and the small thumbnails 440 scroll across the LCD screen 402, the small thumbnail 440 that is positioned over a selection indication in the selection arrow line 502 is considered the currently selected image. Alternatively, the selection indication can be stationary except when positioned near the beginning and the end of the image list.

When no captured images are available in the camera, the LCD 402 can display a message indicating this to be the case. When only one image is available, then the small thumbnail 402 representing that image is displayed above the selection indication in the selection arrow line 502. And when there are more than four images in the camera, the selection arrow line 502 displays arrow heads to indicate movement in that direction is possible with the left/right navigation buttons 410.

After a small thumbnail 440 becomes the currently selected image, additional information corresponding to that image can be automatically displayed in the LCD screen 402. In a preferred embodiment, the additional information includes a resized thumbnail 442 showing a larger view (120×90 pixels) of the currently selected image and image information which can include an icon bar 506 and text 444. The icon bar may display several icons indicating the media types associated with the active image, such as whether the image is a still, a time lapse, or a burst image, whether sound is attached to the image, and a category for the image. The displayed text 444 may include a specification of the name or number of the image, and the date and time the image was captured.

Referring again to FIG. 4, the peripheral display 400 is also shown as displaying the same display format as the LCD 402, which includes small thumbnails 440', a resized thumbnail 442', and text 444'. As stated above, the size and resolution of the LCD 402 and the peripheral display 400 vary greatly. The LCD 402 is typically a 1.8" display, but can be 2–4 inches, and the resolution on the LCD 402 is typically one quarter video resolution. An example of the LCD resolution is 288 pixels for the distance 454 shown in FIG. 4 and 216 pixels for the distance 456 of FIG. 4. In contrast, an example of the resolution for a peripheral display 400 is 640 pixels for the distance 452 of FIG. 4, of which approximately 576 pixels are visible, and 480 pixels for the distance 450 of FIG. 4, of which approximately 432 pixels are visible. Thus, when the peripheral display 400 is used to display the same display format as the camera LCD 402, the camera fails to take advantage of the larger size and greater resolution of the peripheral display 400.

The present invention provides a system and method for detecting when the digital camera has been coupled to the peripheral display 400 and for automatically managing display formats for the peripheral display 400 in response. In operation, when a digital camera is coupled with a peripheral display, the graphical format utilized in the LCD of the digital camera is automatically switched to a second graphical format for the peripheral display. The second graphical format takes advantage of the larger display size and resolution of the peripheral display and displays a larger number of images at a given time.

Figure 6:
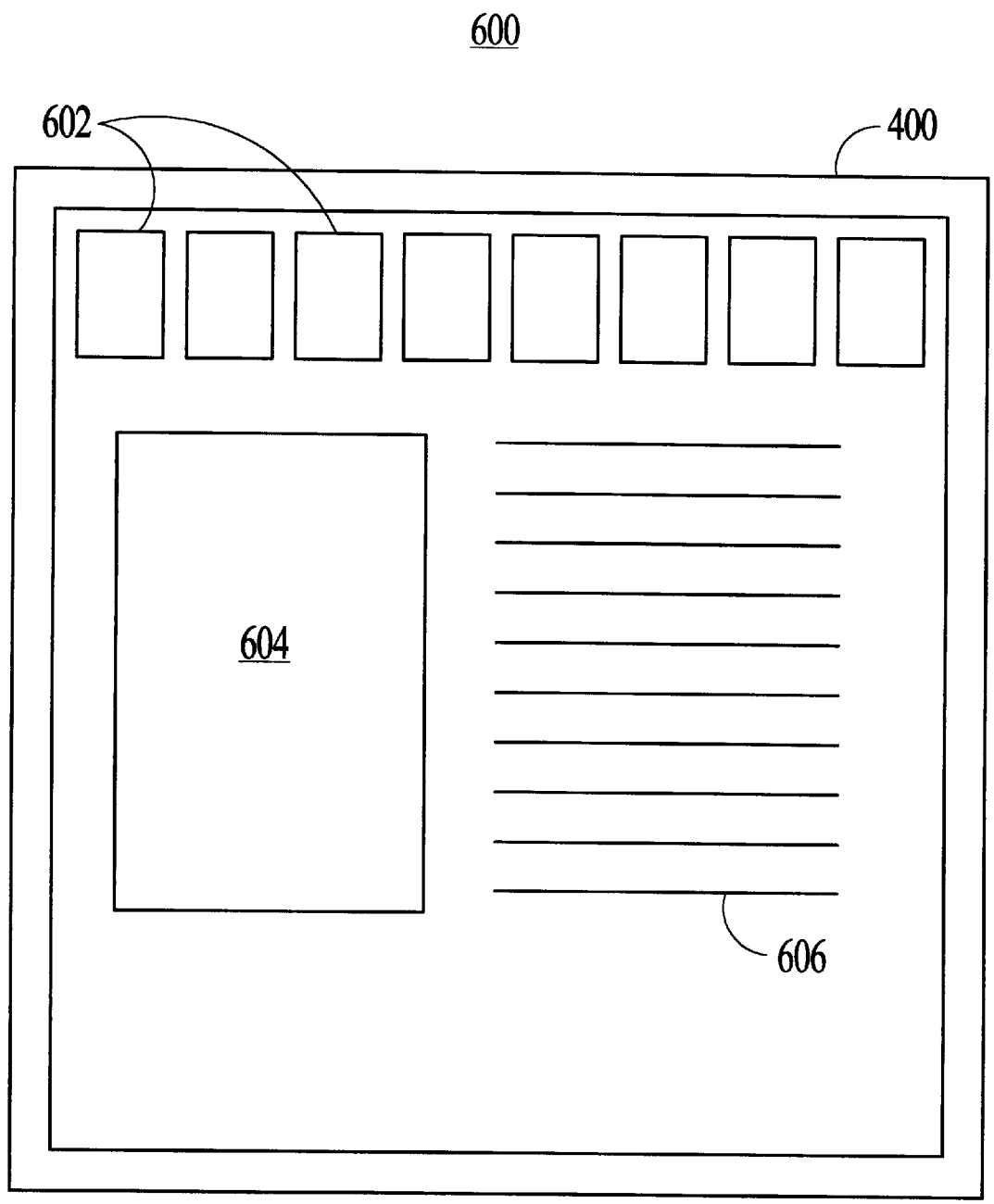
FIG. 6 is an example of a display format which can be automatically displayed on a peripheral display.

FIG. 6 is an example of one display format which can be used in accordance with the system and method of the present invention. The automatic switching of the display formats from the digital camera LCD and the peripheral display takes advantage of the higher resolution of the peripheral display and utilizes a more convenient display format for the user. The peripheral display 400 is shown to include a larger number of small thumbnails 602 than that which is normally displayed on the LCD 402 of the digital camera. In this example, eight small thumbnails 602 are shown to be displayed. In addition, rather than displaying a low-resolution resized thumbnail 604, the present invention displays a medium resolution image, called a screennail, or a high-resolution JPEG image. The peripheral display 400 also includes more text 606 than can be displayed on the LCD of the digital camera.

Figure 7:
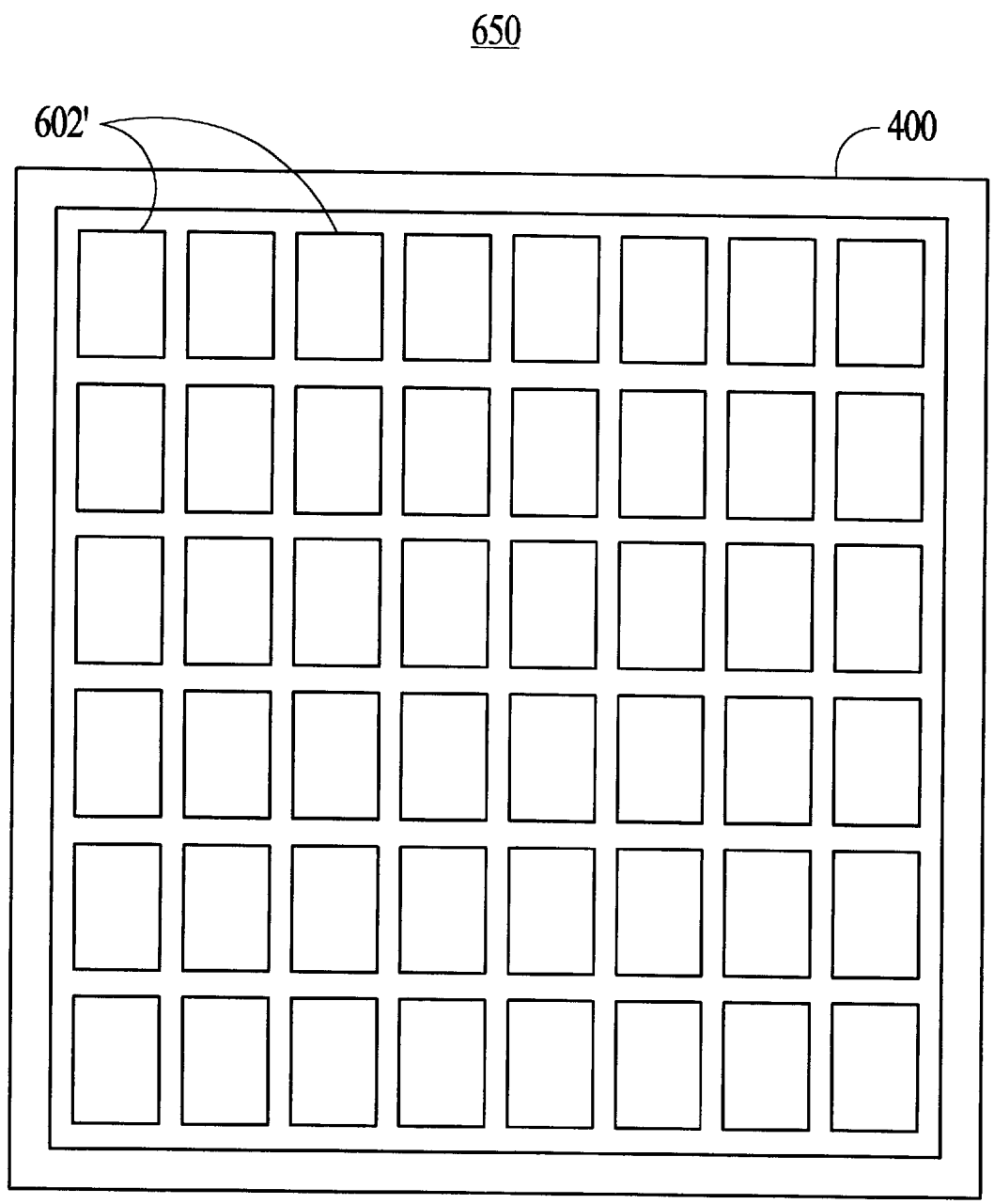
FIG. 7 is an example of another display format which can be displayed on a peripheral display.

FIG. 7 shows another example of a display format for the peripheral display 400 according to the system and method of the present invention. In this example, the entire peripheral display shows small thumbnails 602' in order to allow a user to more quickly scan the contents of the camera. Preferably, the peripheral display 400 shows up to 48 small thumbnails 602'. Note, however, that any screen layout or combination of the examples shown in FIGS. 6 and 7 can be shown on the peripheral display, depending on manufacture and/or user preference.

Figure 8:
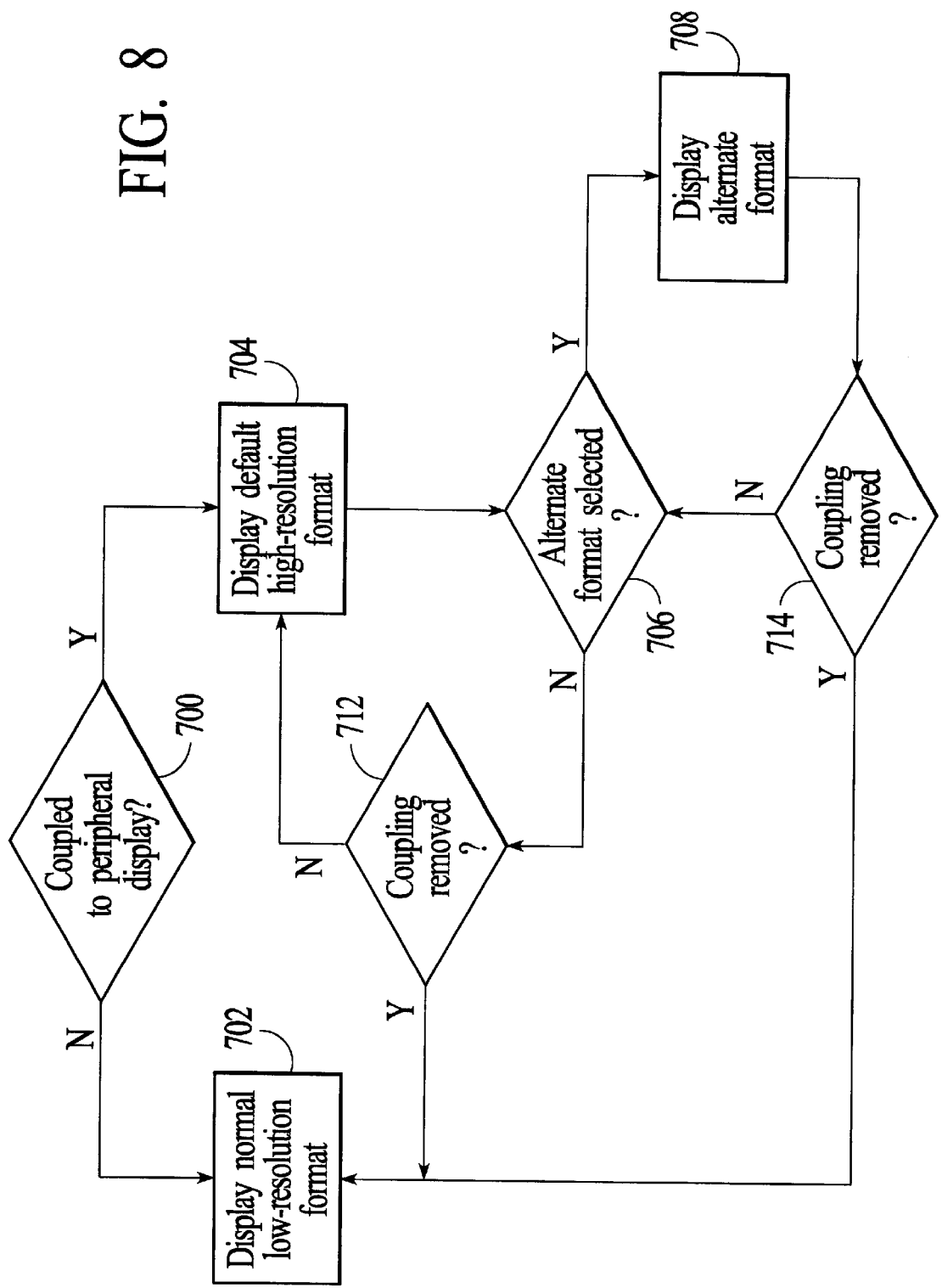
FIG. 8 is a flow diagram of a method for automatically managing display formats for a peripheral display coupled to an digital imaging device according to the present invention.

FIG. 8 is a flow diagram of a method for automatically switching image array size in an digital imaging device according to the present invention. It is determined if the digital camera is coupled to the peripheral display, such as a television, via step 700. This determination of coupling can be via an automatic sensor or manual sensing via a user switch. If the digital camera is not coupled to a peripheral display via step 700, then normal low-resolution camera format is used via step 702. If, however, it is determined that the digital camera is coupled to a peripheral display such as a television, then a default high-resolution format which has been predetermined for the peripheral display is displayed onto the peripheral display via step 704. The default format would be different from the normal digital cameral format, such as those shown in FIGS. 6 and 7. In an alternative embodiment, when the digital camera is coupled to a peripheral display in step 700, then step 704 includes turning-off the LCD of the digital camera, and generating video for the peripheral display.

After the default high-resolution format has been displayed, an alternative display format can be optionally selected by the user via step 706. If an alternative display format has not been selected, then it is determined if the coupling between the camera and the TV has been removed via step 712. If not, the process continues to display the default high-resolution format via step 704. If the coupling has been removed, then the normal low-resolution format is displayed on the camera LCD via step 702. In the embodiment in which the camera LCD is turned-off when a coupling is detected, then the LCD must be turned-on prior to displaying the normal low-resolution format, and the video generated for the TV is no longer generated.

Referring again to step 706, if an alternative display format is selected by the user, then the alternate display format is displayed on the peripheral display via step 708. After displaying the alternate format, it is determined if the coupling between the camera and the TV has been removed via step 714. If the coupling has not been removed, then the process continues via step 706. Otherwise, the normal low-resolution format is displayed on the camera LCD via step 702, as just described. As will be appreciated by those with ordinary skill in the art, the format steps 702, 704, and 708 control the display modes of the digital camera, and each display mode is performed by a software routine(s) running on CPU 344 (FIG. 3).

Figure 9:
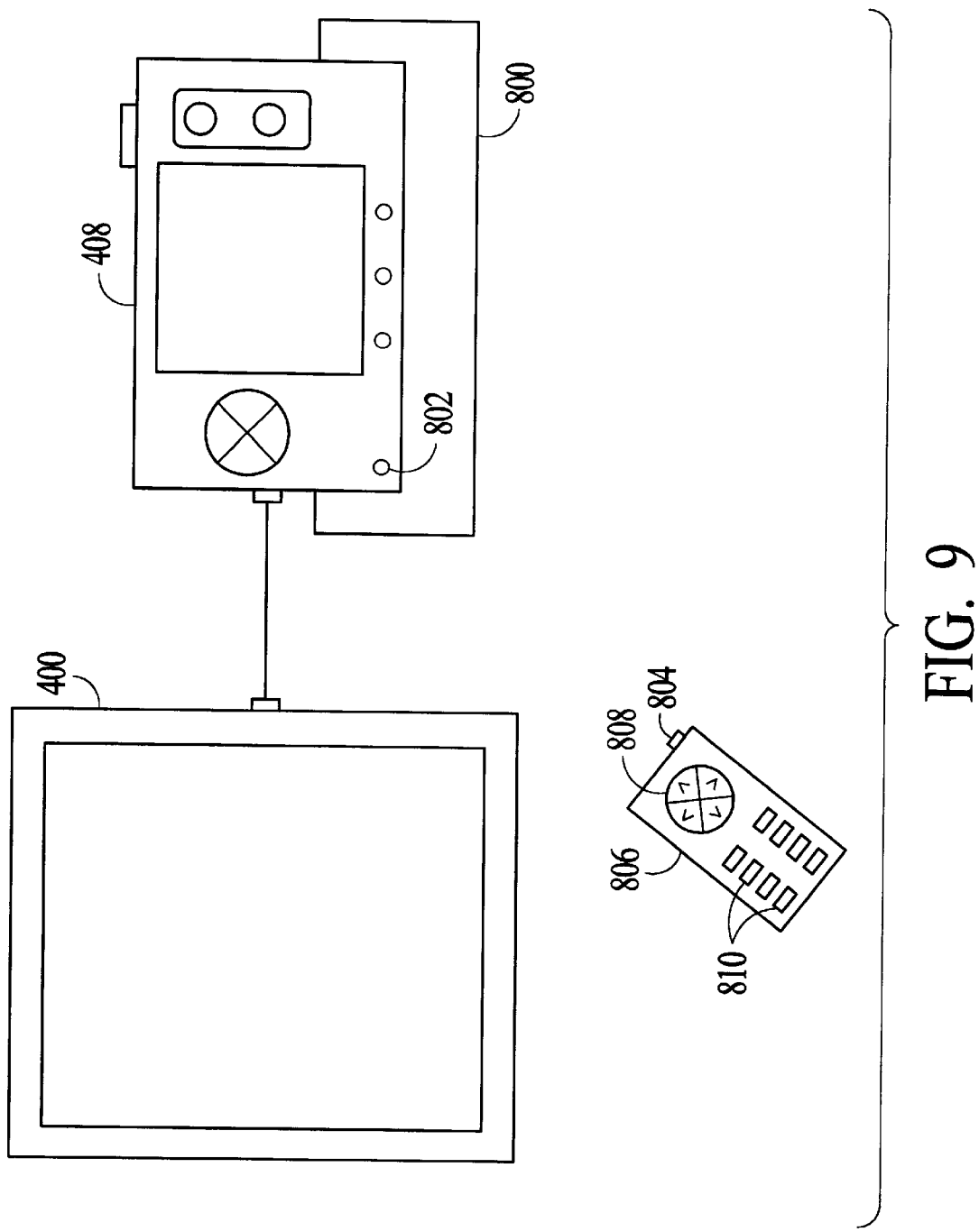
FIG. 9 illustrates an example of how the system according to the present invention may control what is being displayed on the peripheral display.

FIG. 9 is a block diagram of an example of a control system which can work in conjunction with the coupling of the digital camera 408 and the peripheral display 400. FIG. 9 shows the digital camera 408 positioned upon a digital camera station 800. An infrared receiver 802 can be included in the digital camera to receive signals from a remote control 806. The remote control 806 can allow the user to manipulate and control the digital camera 408 and the display 400 in a similar fashion as to the controls of the digital camera 408. Alternatively, the peripheral display 400 can be controlled by the digital camera 408, i.e., the user can hold the digital camera 408 and manipulate the controls on the digital camera which would affect the peripheral display 400.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing display formats for a peripheral display coupled to an digital imaging device, the method comprising:

detecting the coupling between the digital imaging device and the peripheral display, wherein the coupling is automatically detected; and automatically switching a first display format of the digital imaging device to a second display format for the peripheral display in response to the detection of the coupling, wherein the first display format includes a first number of simultaneously displayed still images and the second display format includes a second number of simultaneously displayed still images, wherein the first number of still images is fewer than the second number of still images, the first number of still images is in lower resolution than the second number of still images, and wherein the second display format includes text.

2. The method of claim 1, further comprising a step of switching to a third display format for the peripheral display.

3. The method of claim 1, wherein the second display format includes no less than 196 images.

4. The method of claim 1, wherein the second display format includes text.

5. The method of claim 1, wherein the second display format includes graphics.

6. The method of claim 1, wherein the second display format includes at least one icon.

7. The method of claim 1, wherein the coupling is automatically detected.

8. The method of claim 1, wherein the coupling is manually detected via a manual switch.

9. A system for managing display formats for a peripheral display coupled to an digital imaging device, the system comprising:

means for detecting the coupling between the digital imaging device and the peripheral display, wherein the coupling is automatically detected; and means for automatically switching a first display format of the digital imaging device to a second display format for the peripheral display in response to the detection of the coupling, wherein the first display format includes a first number of simultaneously displayed still images and the second display format includes a second number of simultaneously displayed still images, wherein the first number of still images is fewer than the second number of still images, the first number of still images is in lower resolution than the second number of still images, and wherein the second display format includes text.

10. The system of claim 9, further comprising means for switching to a third display format for the peripheral display.

11. The system of claim 9, wherein the second display format includes no less than 16 images.

12. The system of claim 9, wherein the second display format includes text.

13. The system of claim 9, wherein the second display format includes graphics.

14. The system of claim 9, wherein the second display format includes at least one icon.

15. The system of claim 9, wherein the coupling is automatically detected.

16. The system of claim 9, wherein the means for detecting the coupling is a manual switch.

* * * * *